United States Patent [19]

Joly

[11] 4,218,579
[45] Aug. 19, 1980

[54] ELECTRICITY DISTRIBUTION COLUMN

[75] Inventor: Jean Joly, Houilles, France

[73] Assignee: La Telemecanique Electrique, France

[21] Appl. No.: 891,371

[22] Filed: Mar. 29, 1978

[30] Foreign Application Priority Data

Mar. 31, 1977 [FR] France ................................. 77 09671

[51] Int. Cl.² ........................................... H02G 3/04
[52] U.S. Cl. .................................................. 174/48
[58] Field of Search .......................... 174/48; 362/431; 248/218.4, 219.1, 219.2

[56] References Cited

U.S. PATENT DOCUMENTS

| | | | |
|---|---|---|---|
| 3,161,264 | 12/1964 | Isaacson | 362/431 X |
| 3,888,282 | 6/1975 | Liddall | 174/48 X |
| 3,889,044 | 6/1975 | Flachbarth et al. | 174/48 |
| 3,918,224 | 11/1975 | Sundequist | 174/48 X |
| 4,015,397 | 4/1977 | Flachbarth et al. | 174/48 X |
| 4,092,486 | 5/1978 | Myers | 174/48 |

FOREIGN PATENT DOCUMENTS 1472335  5/1977  United Kingdom .

Primary Examiner—Gerald P. Tolin
Assistant Examiner—D. A. Tone
Attorney, Agent, or Firm—William A. Drucker

[57] ABSTRACT

An electricity distribution column for administrative premises is made up of a U-shaped section whose top does not touch the ceiling and receives a tubular extension going up to the latter and receiving the connecting conductors, the ends of the branches of the U serving as a guide for a flexible cover inserted either from the top or the bottom.

4 Claims, 5 Drawing Figures

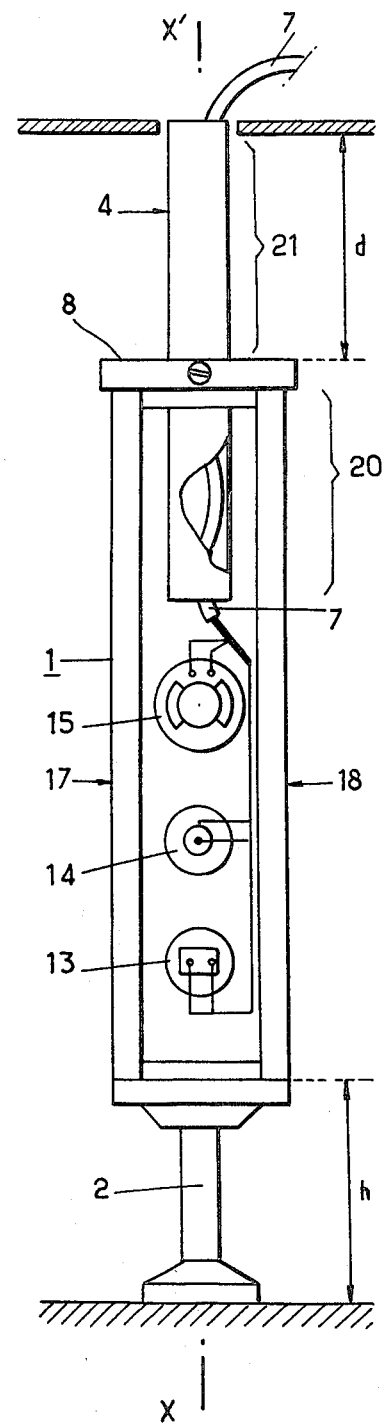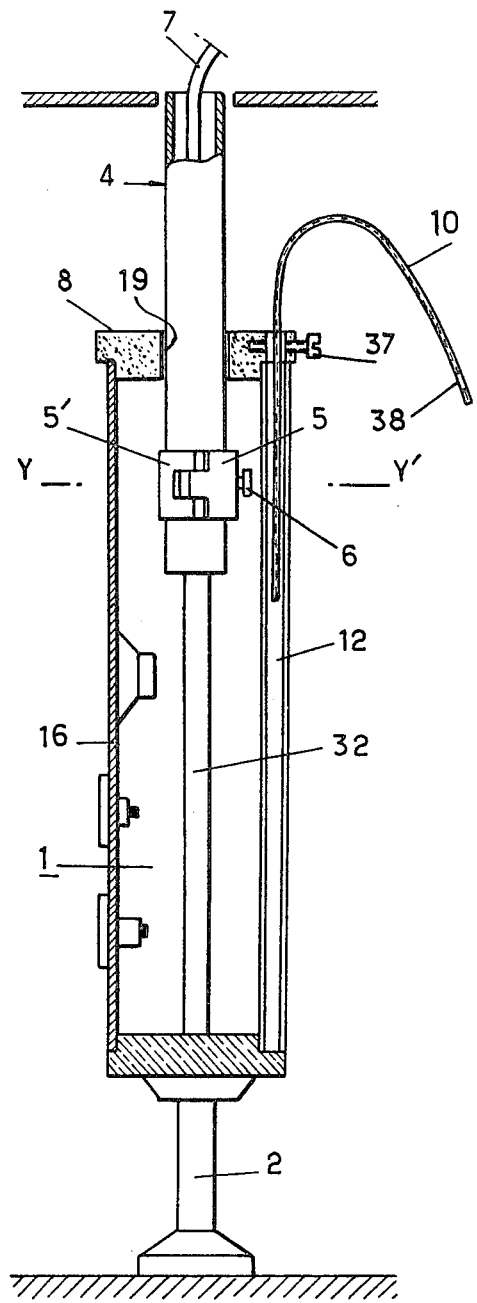

ELECTRICITY DISTRIBUTION COLUMN

The invention relates to a column, for the distribution of power and/or information, designed to be fixed between the floor and the ceiling of premises and comprising principally a tubular body carrying electric point units and receiving in its inside area connecting conductors leading to a hole in the ceiling, the body consisting of a U-shaped section closed by a cover placed on the two branches of the section.

BACKGROUND OF THE INVENTION

In known devices, the body of the column generally consists of a section which has to be cut to a length compatible with the height of the ceiling; this measurement thus requires the manufacture of very long bodies and consequently causes the creation of considerable scrap metal.

Moreover, access to the point units is provided either by a cover which snaps on the body and, in this case, unauthorised staff can obtain access to live terminals, or by a hinged cover which it is difficult to make flat, because of its size, not to mention the difficulty of making a hinge which it is sought to conceal inside the body.

OBJECT OF THE INVENTION

The object of the invention is to provide a distribution column in which the drawbacks mentioned above are radically overcome, at the same time making it very easy to handle and giving it a pleasing appearance.

SUMMARY OF THE INVENTION

According to the present invention, the desired result is obtained in that the tubular body rests on the floor via a stand of a specific height, and comprises in its top area an inner guiding and clamping system providing for the sliding and holding in position respectively of a sliding tubular extension whose position in relation to the body can be adjusted because the top of said body is placed at a specific distance from the ceiling, the connecting conductors go through the extension, and a flexible elastic plate, acting as a cover, can be inserted from the top or bottom into two opposite grooves in the body sited at the ends of the branches of the body.

BRIEF DESCRIPTION OF THE DRAWINGS

A better understanding of the invention will be obtained from the ensuring description, with reference to the accompanying drawings, wherein:

FIG. 1 shows a column unit seen from the back, with the cover removed;

FIG. 2 shows the same column in partial section along the line X—X' with a cover partially inserted;

DESCRIPTION OF THE PREFERRED EMBODIMENT

Figure 3:
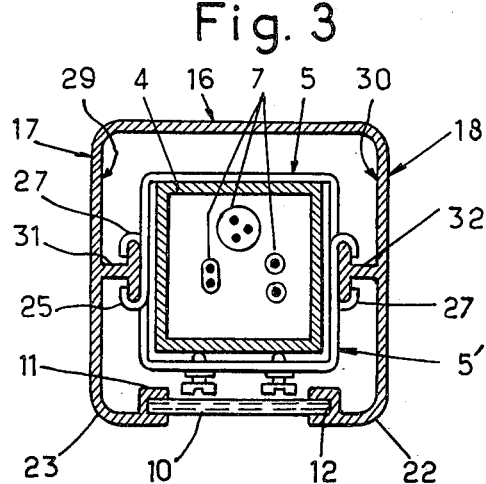
FIG. 3 is a section along the line Y—Y' of an embodiment of the extension guiding and clamping system.

Referring to FIG. 1, 1 identifies the body of the column which rests on the floor by means of a stand 2 sitting the column at a specific height h from the floor. Point units such as a power socket 13, a telephone plug socket 14, and information distribution equipment such as a loud-speaker 15, are arranged on the base 16 which connects the two branches 17, 18 of the U-shaped section forming the body 1 and which can be seen in section in FIG. 3.

The top of the body is partly closed by a cover 8, provided with an opening 19 to give passage to a tubular extension 4 whose bottom 20 is positioned inside the body, while the top 21 extends over a distance d to the ceiling.

Connecting conductors 7 make it possible to supply units 13, 14, 15 from the area close to the ceiling by passing through the extension.

FIG. 3 shows a detail of the way in which the ends 22, 23 of branches 18 and 17 respectively are equipped with facing grooves 12, 11. These grooves, which go from bottom to top of the column, receive a plate 10, forming a cover closing the inner space of the column, whose width, thickness and flexibility are such as to allow it to be put in position by resilient bending, either from the top, using distance d separating the top of body 1 from ceiling 9, or from the bottom of the grooves, using the height h of the stand.

If it is desired to prevent staff from obtaining access to the inside of the column, it is possible for example, to shut off the bottom area of the grooves with the top surface of the stand, so that the top area, the only one enabling the cover to be removed, will be at a height likely to discourage attempts to gain unauthorised access, a measure advantageously complemented by the insertion of a screw 37 going through the opening 38 in the plate. In this case, distance d will advantageously be used to enable the cover to assume a curvature which is not dangerous.

Figure 4:
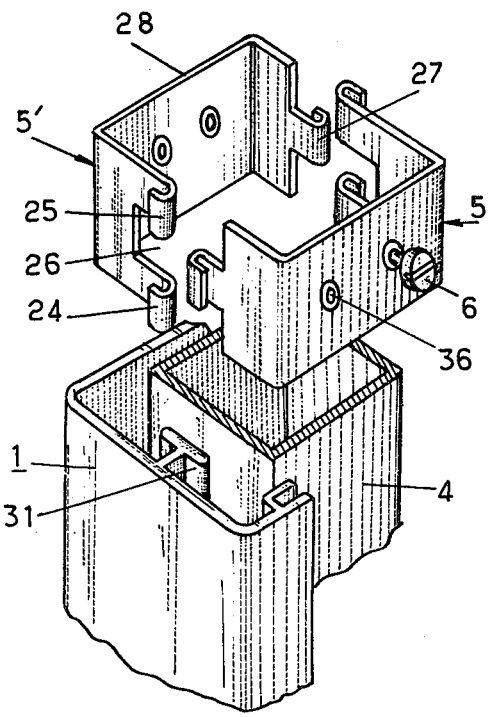
FIG. 4 complements FIG. 3 by a perspective view of the clamping components.

Extension 4, which can be seen in FIG. 3 is encircled by a clamping device, also providing means for it to slide, which includes two identical half-collars 5 and 5', whose shape is in accordance with the one shown in FIG. 4.

Each half-collar is in the shape of a U whose two wings comprise external hooks at the ends; one of the wings has two hooks 24, 25 separated longitudinally by a gap 26, while the other wing has a single external hook 27 positioned opposite said gap.

In the base 28 common to the two wings of half-collar 5 there are threaded openings 36, traversed by tightening components 6, screws or wing-nuts.

Moreover, surfaces 29, 30 opposite branches 18, 17 of the section forming the body, each comprise a projecting longitudinal section 31, 32 respectively whose section is in the shape of a T.

FIG. 3 clearly shows how the hooks of the two half-collars interlock and hook on to the opposite ends of the cross-pieces of the T-sections to form an area sufficient to allow the extension to pass.

When screws 6 are moved parallel to the wings and towards the inside of the collar, this simultaneously causes the extension to be gripped between the half-collars and the latter to be hooked on to the longitudinal sections 31, 32 by their hooks.

Figure 5:
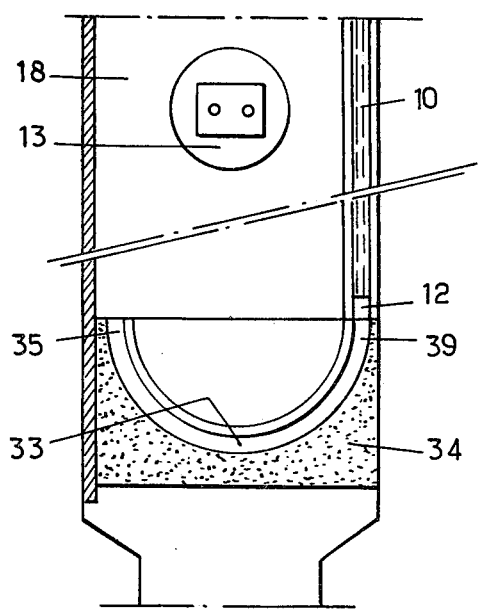
FIG. 5 illustrates a variant in which the cover, when open, is concealed inside the column.

In the variant illustrated by FIG. 5, each groove 11, 12 is cut off some distance from the bottom of body 1 which receives curved slides 33 possibly integral with a support 34 which closes the area where the grooves have been removed.

These slides 33 have their respective entrances 39 facing grooves 11, 12 while their exit 35 is pointed towards the top of the column.

The flexible plate constituting the cover can, in this form of embodiment, be slid into the column to give access to the point units which, in this case, are positioned on one of the branches of the body to allow the bottom of the cover to pass.

I claim:

1. In combination, an electrical and communication distribution-column, a ceiling structure having a hole and a floor structure, wherein the column comprises an outer tubular body, stand means siting the said body at predetermined height above the floor structure, a tubular inner body and clamping means for slidably mounting said inner body within said outer body and holding said inner body in relation to said outer body, in an adjustable position in which the top of said inner body projects from the outer body and cooperates with the said hole, the outer body having a U-shaped section comprising two branches respectively terminated by facing grooves running from a bottom portion which shuts off the said outer body at the lower end thereof, point units being arranged on the inner surface of the outer body and electrical conductors passing through the said hole, within the said inner body and being connected to the said point units, and a flexible cover plate inserted into said grooves.

2. A combination according to claim 1, wherein the branches of the said outer body each comprise a longitudinal inwardly projecting guiding section and said inner body has hooking means slidably engaging said guiding sections and tightening means for securing the hooking means to the guiding sections.

3. A combination according to claim 2, wherein the said hooking means comprise two identical U-shaped elements, each having first and second facing wings and a common base connecting the said wings, the first wing having two outwardly upturned hook portions separated longitudinally by a gap, and the second wing having a single outwardly upturned hook portion positioned facing said gap, openings in the said base and elongated tightening components engaging the said openings parallel to the wings, the guiding sections each being in the shape of a T having a cross-piece the ends of which are respectively engaged by the respective hook portions.

4. A combination according to claim 1, wherein the said point units are arranged on one of the branches of the outer body, and wherein the said bottom portion has two curved slides respectively extending the said grooves and each having an entrance facing the bottom end of said flexible cover plate and an exit pointing towards the top of the column.

* * * * *